UNITED STATES PATENT OFFICE

2,141,172

DERIVATIVES OF PHENYL-PHENYL ESTERS

Walter G. Christiansen, Glen Ridge, N. J., and Sidney E. Harris, Lynbrook, N. Y., assignors to E. R. Squibb & Sons, New York, N. Y., a corporation of New York No Drawing. Original application September 7, 1933, Serial No. 688,496. Divided and this application July 2, 1936, Serial No. 88,590

7 Claims. (Cl. 260—479)

This application is a division of application Serial No. 688,496, filed September 7, 1933.

This invention relates to, and has for its object the provision of, certain new compositions, characterized by high activity but low toxicity as urinary bactericides, and useful as intermediates.

Compositions of this invention comprise compounds having the general formula

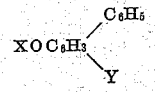

wherein X represents an acyl and Y represents an alkyl or a halogen.

EXAMPLES

2-phenyl-4-n-propyl-phenyl acetate 4.3 g. 2-hydroxy 5-n-propyl diphenyl and 10 cc. acetic anhydride are refluxed for half an hour and then poured into water; the precipitated oil is extracted with ether; the extract is washed with sodium carbonate solution and dried with calcium chloride; and after removing the ether, the desired compound is distilled in vacuo, boiling at 168–175°/5 mm.

Monochloro-3-phenyl-phenyl benzoate 31 g. monochloro 3-hydroxy diphenyl, 24 g. benzoyl chloride, 33 cc. 35% sodium hydroxide, and 100 cc. water are shaken until the benzoyl chloride odor disappears; the thick oily product is extracted with ether; the extract is washed with dilute sodium hydroxide and water and dried with calcium chloride; and, the ether being distilled off, the desired compound remains as a viscous oil.

2-chloro-4-phenyl-phenyl benzoate 51 g. 3-chloro 4-hydroxy diphenyl, 43 g. benzoyl chloride, 57 cc. 35% sodium hydroxide, and 150 cc. water, being interacted as in the preceding two examples, the desired compound is obtained, on recrystallization from hot alcohol, in the form of crystals melting at 110–111° (corrected).

2-phenyl-4-bromo-phenyl acetate 20 g. 2-hydroxy 5-bromo diphenyl is heated with 30 cc. acetic anhydride under a reflux condenser for one hour; the product is poured into water and stirred vigorously to decompose the excess of acetic anhydride; and the residual oil, on being washed several times with sodium carbonate solution and then with water, solidifies into hard white crystals of the desired compound, which on recrystallization from diluted alcohol melt at 66–67°.

2-phenyl-6-chloro-phenyl benzoate 50 g. 2-hydroxy 3-chloro diphenyl is dissolved in 250 cc. 10% sodium hydroxide; 50 cc. benzoyl chloride is added; the mixture is vigorously shaken until all the benzoyl chloride has undergone reaction; the crystalline mass formed is washed successively with cold dilute sodium hydroxide solution and water; and recrystallization from petroleum ether yields the desired compound as a white crystalline solid melting at 86–87° (corrected).

2-phenyl-4-chloro-phenyl benzoate 40 g. 2-hydroxy 5-chloro diphenyl is dissolved in 250 cc. dry toluene; 30 g. benzoyl chloride is added; the mixture is refluxed until the evolution of hydrogen chloride ceases, is allowed to cool, is washed several times with cold 5% sodium hydroxide and then with water, and is dried with calcium chloride; the toluene is removed under reduced pressure; and recrystallization of the residue from methyl alcohol yields the desired compound as fine white needles melting at 88.5° (corrected).

Monobromo-3-phenyl-phenyl benzoate 5 g. monobromo 3-hydroxy diphenyl is dissolved in 50 cc. 10% sodium hydroxide solution; 5 cc. benzoyl chloride is added; the mixture is vigorously shaken until the odor of benzoyl chloride has disappeared; the oily precipitate formed is extracted with ether; the ether solution is washed thoroughly with 5% sodium hydroxide solution and water and dried with calcium chloride; and on distillating off the ether the desired compound remains as a thick oil.

2-phenyl-4-n-propyl-phenyl benzoate 42 g. 2-hydroxy 5-n-propyl diphenyl is dissolved in 250 cc. dry toluene; 26.5 g. benzoyl chloride is added; the mixture is refluxed until the evolution of hydrogen chloride ceases, is allowed to cool, is washed with cold 5% sodium hydroxide and then with water, and is dried with calcium chloride; the toluene is removed by distillation under reduced pressure; and by recrystallization from petroleum ether the desired compound is obtained as white needles melting at 96° (corrected).

2-phenyl-6-chloro-phenyl cinnamate 40 g. 2-hydroxy 3-chloro-diphenyl and 30 g.

cinnamic acid are dissolved in 250 cc. toluene; 15 cc. phosphorus trichloride is added; the mixture is refluxed until the evolution of hydrogen chloride ceases; the toluene solution is decanted from the precipitated phosphorous acid; the toluene is completely removed by distillation under reduced pressure; the residue is dissolved in a suitable solvent such as ether; the solution is washed with 5% sodium hydroxide solution and water and dried with calcium chloride; the ether is distilled off; and the residue, on recrystallization from petroleum ether or from dilute alcohol, yields the desired compound as white needles melting at 74.5–75° (corrected).

2-phenyl-4-n-propyl-phenyl cinnamate 40 g. 2-hydroxy 5-n-propyl diphenyl and 30 g. cinnamic acid are dissolved in 250 cc. dry toluene; 50 cc. phosphorus oxychloride is added; the mixture is refluxed until the evolution of hydrogen chloride ceases, is allowed to cool, and is washed with dilute sodium hydroxide solution and water and dried with calcium chloride; the toluene is distilled off under reduced pressure; the residue, on being recrystallized from petroleum ether, yields the desired compound as fine matted white needles melting at 72.5° (corrected).

2-phenyl-6-chloro-phenyl salicylate 41 g. 2-hydroxy 3-chloro diphenyl is dissolved in 250 cc. dry toluene; 25 g. salicylic acid is dissolved in the solution; 15.5 g. phosphorus oxychloride is added; the mixture is refluxed until the evolution of hydrogen chloride ceases; the toluene solution is decanted from the precipitated phosphorous acid; the toluene is distilled off under somewhat reduced pressure; the oily residue crystallizes after a short time, and on recrystallization from methyl alcohol the desired compound is obtained in the form of needles melting at 107° (corrected).

It is to be understood that the foregoing examples are merely illustrative and by no means limitative of the invention, which may be variously otherwise embodied—as with respect to particular compounds and methods of preparing them—within the scope of the appended claims.

We claim:
1. Compounds having the general formula

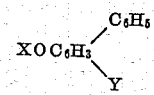

wherein X represents a carboxylic acyl and Y represents a member of the group consisting of alkyl and halogen.

2. Compounds having the general formula

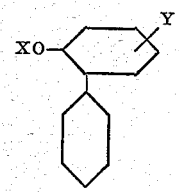

wherein X represents a carboxylic acyl and Y represents a member of the group consisting of alkyl and halogen.

3. Compounds having the general formula

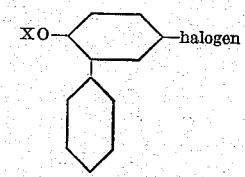

wherein X represents a carboxylic acyl.

4. Compounds having the general formula

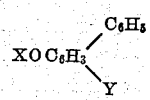

wherein X represents an acyl of the group consisting of acetyl, benzoyl, cinnamoyl, and salicylyl and Y represents a member of the group consisting of alkyl and halogen.

5. 2-phenyl-4-bromo-phenyl acetate.
6. 2-phenyl-4-n-propyl-phenyl benzoate.
7. 2-phenyl-6-chloro-phenyl salicylate.

WALTER G. CHRISTIANSEN.
SIDNEY E. HARRIS.